United States Patent
Ueda et al.

(10) Patent No.: US 10,464,634 B2
(45) Date of Patent: Nov. 5, 2019

(54) BICYCLE REAR DERAILLEUR

(71) Applicant: Shimano Inc., Sakai, Osaka (JP)

(72) Inventors: Takeshi Ueda, Osaka (JP); Shouta Suyama, Osaka (JP); Kenta Nakamura, Osaka (JP)

(73) Assignee: Shimano Inc., Osaka (JP)

( * ) Notice: Subject to any disclaimer, the term of this patent is extended or adjusted under 35 U.S.C. 154(b) by 329 days.

(21) Appl. No.: 15/647,636

(22) Filed: Jul. 12, 2017

(65) Prior Publication Data
US 2019/0016411 A1    Jan. 17, 2019

(51) Int. Cl.
| | |
|---|---|
| *B62M 9/125* | (2010.01) |
| *B62M 9/1248* | (2010.01) |
| *B62M 9/135* | (2010.01) |
| *B62M 9/121* | (2010.01) |
| *B62M 9/1244* | (2010.01) |
| *B62M 9/1242* | (2010.01) |
| *B62M 25/02* | (2006.01) |

(52) U.S. Cl.
CPC ............ *B62M 9/125* (2013.01); *B62M 9/121* (2013.01); *B62M 9/1242* (2013.01); *B62M 9/1244* (2013.01); *B62M 9/1248* (2013.01); *B62M 9/135* (2013.01); *B62M 25/02* (2013.01)

(58) Field of Classification Search
CPC .... B62M 9/125; B62M 9/121; B62M 9/1251; B62M 9/124; B62M 9/1242; B62M 9/1248; B62M 2009/12406; B62M 2009/12913; B62M 9/131; B62M 9/134; B62M 9/1344; B62M 9/135; B62M 9/12; B62M 25/02

USPC .......................................................... 474/80
See application file for complete search history.

(56) References Cited

U.S. PATENT DOCUMENTS

| | | | | |
|---|---|---|---|---|
| 4,906,036 A | * | 3/1990 | James ................. | E05B 63/0056 292/202 |
| 5,152,720 A | * | 10/1992 | Browning ............ | B62M 9/1242 474/80 |
| 5,163,881 A | * | 11/1992 | Chattin .................. | B62M 9/123 474/78 |

(Continued)

FOREIGN PATENT DOCUMENTS

CN    206141752 U    5/2017

*Primary Examiner* — Michael R Mansen
*Assistant Examiner* — Raveen J Dias
(74) *Attorney, Agent, or Firm* — Global IP Counselors, LLP (57) ABSTRACT

A bicycle rear derailleur is basically provided with a base member including a frame mounting portion having a mounting opening, and a fastening member extending through the mounting opening of the base member. The fastening member has a first threaded portion and a placement portion adjacent to the first threaded portion. An adjusting member is configured to adjust a position of the bicycle rear derailleur relative to a bicycle. An intermediate member includes a contact portion disposed between the adjusting member and the bicycle. The intermediate member has a second threaded portion configured to threadedly engage with the first threaded portion of the fastening member. The second threaded portion has an innermost diameter that is smaller than the outermost diameter of the first threaded portion. The intermediate member is disposed on the placement portion of the fastening member.

12 Claims, 5 Drawing Sheets

(56) References Cited

U.S. PATENT DOCUMENTS

| | | | | |
|---|---|---|---|---|
| 5,498,211 | A | * | 3/1996 | Hsu ................... B62M 9/1248 474/80 |
| 5,836,844 | A | | 11/1998 | Yoshida |
| 5,961,409 | A | * | 10/1999 | Ando ................... B62M 9/1244 474/80 |
| 6,287,228 | B1 | * | 9/2001 | Ichida ................. B62M 9/1248 474/80 |
| 7,189,172 | B2 | | 3/2007 | Shahana et al. |
| 7,614,972 | B2 | | 11/2009 | Oseto |
| 7,963,870 | B2 | | 6/2011 | Deguchi et al. |
| 9,334,016 | B2 | | 5/2016 | Shahana et al. |
| 2004/0116222 | A1 | * | 6/2004 | Shahana ................ B62M 9/125 474/82 |
| 2006/0105869 | A1 | * | 5/2006 | Fukuda ................ B62M 9/125 474/80 |
| 2006/0194660 | A1 | * | 8/2006 | Shahana ................ B62M 9/12 474/82 |
| 2008/0051237 | A1 | * | 2/2008 | Shahana ............. B62M 9/1244 474/82 |
| 2008/0064544 | A1 | * | 3/2008 | Yamaguchi ........... B62M 9/125 474/80 |
| 2008/0081716 | A1 | * | 4/2008 | Watarai ................ B62M 9/125 474/80 |
| 2009/0275429 | A1 | * | 11/2009 | Deguchi ............... B62M 9/125 474/80 |
| 2010/0004079 | A1 | * | 1/2010 | Watarai ................ B62M 9/125 474/80 |
| 2018/0170481 | A1 | * | 6/2018 | Pasqua ................. B62M 9/121 |
| 2018/0265169 | A1 | * | 9/2018 | Braedt .................. B62K 25/02 |
| 2018/0346068 | A1 | * | 12/2018 | Calendrille, Jr. ...... B62M 9/125 |

* cited by examiner

BICYCLE REAR DERAILLEUR

BACKGROUND

Field of the Invention

This invention generally relates to a bicycle derailleur. More specifically, the present invention relates to a bicycle rear derailleur.

Background Information

Generally, a bicycle typically uses a bicycle drive train for transmitting a pedaling force to a rear wheel. The drive train of a bicycle often uses one or two derailleurs to selectively move a bicycle chain from one of a plurality of sprockets to another for changing speeds of the bicycle.

SUMMARY

Generally, the present disclosure is directed to various features of a bicycle rear derailleur. In one feature, a bicycle rear derailleur is provided in which an intermediate member is prevented from being removed from a fastening member extending through a base member of the bicycle rear derailleur.

In view of the state of the known technology and in accordance with a first aspect of the present disclosure, a bicycle rear derailleur is provided that basically comprises a base member including a frame mounting portion having a mounting opening, and a fastening member extending through the mounting opening of the base member. The fastening member has a first threaded portion and a placement portion adjacent to the first threaded portion. An adjusting member is configured to adjust a position of the bicycle rear derailleur relative to a bicycle in a state where the bicycle rear derailleur is mounted to the bicycle. An intermediate member includes a contact portion disposed between the adjusting member and the bicycle in the state where the bicycle rear derailleur is mounted to the bicycle. The intermediate member has a second threaded portion configured to threadedly engage with the first threaded portion of the fastening member. The second threaded portion has an innermost diameter that is smaller than the outermost diameter of the first threaded portion. The intermediate member is disposed on the placement portion of the fastening member in the state where the bicycle rear derailleur is mounted to the bicycle.

With the bicycle rear derailleur according to the first aspect, it is possible to prevent removal of the intermediate member from the fastening member without an additional placement member, thereby reducing manufacturing costs.

In accordance with a second aspect of the present invention, the bicycle rear derailleur according to the first aspect is configured so that the placement portion includes a non-threaded portion.

With the bicycle rear derailleur according to the second aspect, it is possible to reduce a distance necessary to rotate the intermediate member.

In accordance with a third aspect of the present invention, the bicycle rear derailleur according to the first or second aspect is configured so that the fastening member includes a tool engagement portion.

With the bicycle rear derailleur according to the third aspect, it is possible to improve installation efficiency because an assembler can use a tool.

In accordance with a fourth aspect of the present invention, the bicycle rear derailleur according to the third aspect is configured so that the placement portion is disposed between the tool engagement portion and the first threaded portion.

With the bicycle rear derailleur according to the fourth aspect, it is possible to prevent removal of the intermediate member from the fastening member without an additional placement member, thereby reducing manufacturing costs.

In accordance with a fifth aspect of the present invention, the bicycle rear derailleur according to any of the first to fourth aspects is configured so that the placement portion has a first diameter that is smaller than the outermost diameter of the first threaded portion.

With the bicycle rear derailleur according to the fifth aspect, it is possible to prevent removal of the intermediate member from the fastening member without an additional placement member, thereby reducing manufacturing costs.

In accordance with a sixth aspect of the present invention, the bicycle rear derailleur according to any of the first to fifth aspects is configured so that a first axial width of the placement portion is larger than a second axial width of the second threaded portion of the intermediate member with respect to an axial direction parallel to a rotational center axis of the fastening member.

With the bicycle rear derailleur according to the sixth aspect, it is possible to more securely dispose the intermediate member on the placement portion of the fastening member.

In accordance with a seventh aspect of the present invention, the bicycle rear derailleur according to any of the first to sixth aspects is configured so that the base member is slidably disposed with respect to the fastening member.

With the bicycle rear derailleur according to the seventh aspect, it is possible to prevent removal of the intermediate member from the fastening member without an additional placement member, thereby reducing manufacturing costs.

In accordance with an eighth aspect of the present invention, the bicycle rear derailleur according to the second aspect is configured so that the non-threaded portion includes a first non-threaded portion and a second non-threaded portion, and that the intermediate member is disposed on the first non-threaded portion.

With the bicycle rear derailleur according to the eighth aspect, it is possible to prevent removal of the intermediate member from the fastening member without an additional placement member, thereby reducing manufacturing costs.

In accordance with a ninth aspect of the present invention, the bicycle rear derailleur according to the eighth aspect is configured so that the first non-threaded portion has a first diameter, and that the second non-threaded portion has a second diameter that is larger than the first diameter of the first non-threaded portion.

With the bicycle rear derailleur according to the ninth aspect, it is possible to prevent removal of the intermediate member from the fastening member without an additional placement member, thereby reducing manufacturing costs.

In accordance with a tenth aspect of the present invention, the bicycle rear derailleur according to any of the first to ninth aspects is configured so that the first threaded portion includes a male thread, and that the second threaded portion includes a female thread.

With the bicycle rear derailleur according to the tenth aspect, it is possible to prevent removal of the intermediate member from the fastening member without an additional placement member, thereby reducing manufacturing costs.

In accordance with an eleventh aspect of the present invention, the bicycle rear derailleur according to any of the first to tenth aspects is configured so that the intermediate member includes a first surface facing a vertical center plane of the bicycle in the state where the bicycle rear derailleur is mounted to the bicycle and the first surface includes a knurled portion.

With the bicycle rear derailleur according to the eleventh aspect, it is possible to maintain a rotational orientation of the intermediate member with respect to the bicycle because the knurled portion provides increased friction in the mounted state.

In accordance with a twelfth aspect of the invention, the bicycle rear derailleur according to any of the first to tenth aspects further comprises a gasket disposed on the placement portion of the fastening member. The intermediate member includes a first surface facing a vertical center plane of the bicycle in the state where the bicycle rear derailleur is mounted to the bicycle. The gasket is disposed adjacent to the first surface of the intermediate member.

With the bicycle rear derailleur according to the twelfth aspect, it is possible to maintain a rotational orientation of the intermediate member with respect to the bicycle because the gasket provides increased friction in the mounted state.

Also, other objects, features, aspects and advantages of the disclosed bicycle rear derailleur will become apparent to those skilled in the art from the following detailed description, which, taken in conjunction with the annexed drawings, discloses embodiments of the bicycle rear derailleur.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
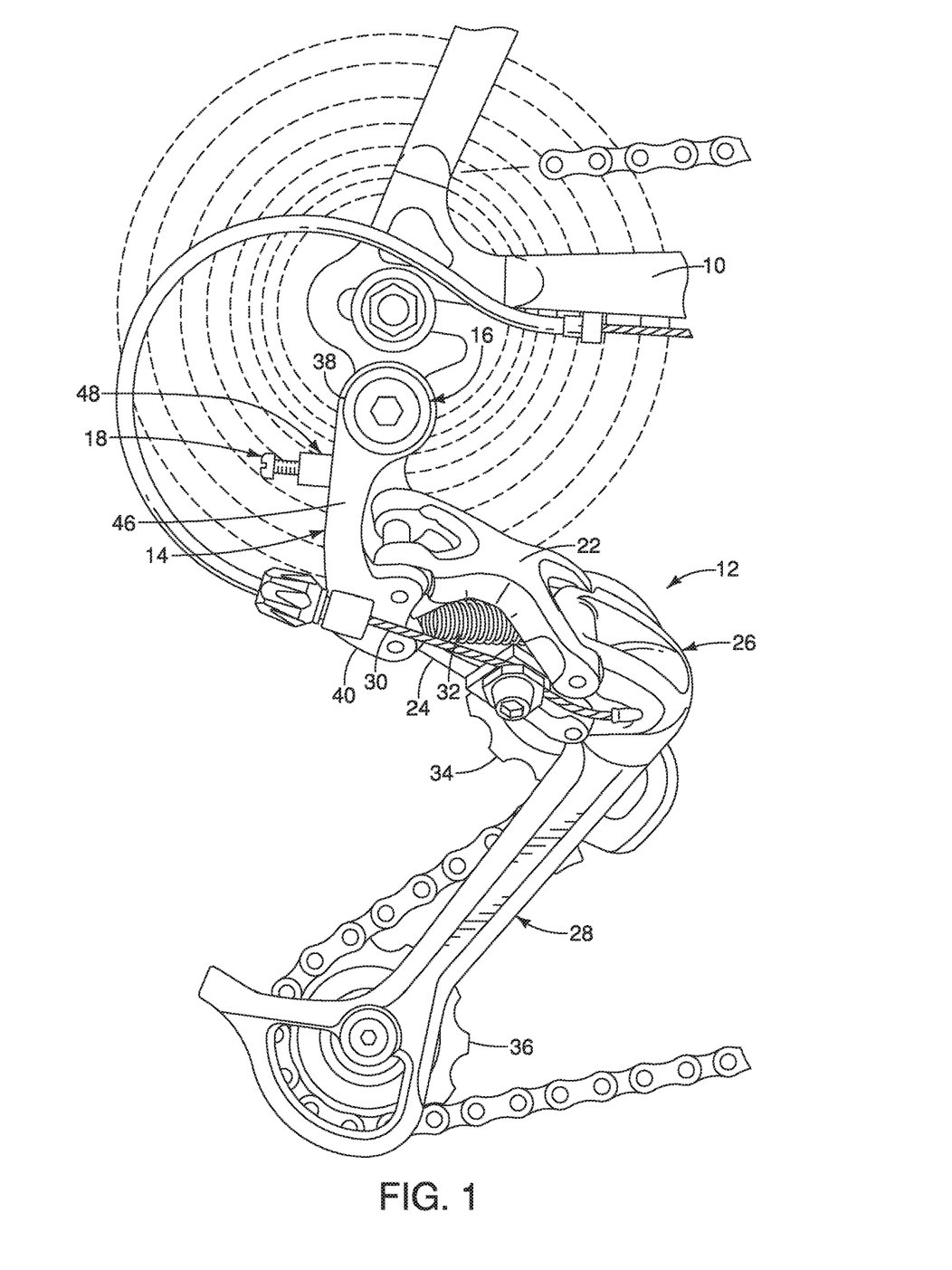
FIG. 1 is a side outboard elevational view of a part of a bicycle that is equipped with a bicycle rear derailleur in accordance with one illustrated embodiment.

Referring initially to FIG. 1, a bicycle including a bicycle frame 10 is illustrated that is equipped with a bicycle rear derailleur 12 in accordance with an exemplary embodiment. The bicycle rear derailleur 12 in accordance with the exemplary embodiment illustrated in FIGS. 1 to 7 includes a base member 14, a fastening member 16, an adjusting member 18 and an intermediate member 20.

The bicycle rear derailleur 12 is secured to the bicycle frame 10 as discussed below. Referring to FIGS. 1 to 4, the bicycle rear derailleur 12 further includes a pair of links 22 and 24 and a movable member 26 with a chain guide 28 pivotally mounted to the movable member 26. The links 22 and 24 form a moving mechanism that is coupled between the base member 14 and the movable member 26 so that the movable member 26 is movable relative to the base member 14.

Basically, the bicycle rear derailleur 12 is a conventional rear derailleur in which an inner wire 30 of a Bowden cable assembly is coupled to one of the links 22 and 24 (for example, the inner wire 30 is coupled to the link 24 in the illustrated embodiment) to move the movable member 26 and the chain guide 28 laterally relative to the base member 14. A coil spring 32 is connected to diagonally opposite pivot shafts so that the links 22 and 24 are biased together. The chain guide 28 basically includes a pair of chain cage plates with a guide pulley 34 and a tension pulley 36 disposed between the chain cage plates. Generally, the bicycle rear derailleur 12 can be any rear derailleur, and thus, the conventional parts of the bicycle, rear derailleur 12 will not be discussed or illustrated in detail herein.

Figure 5:
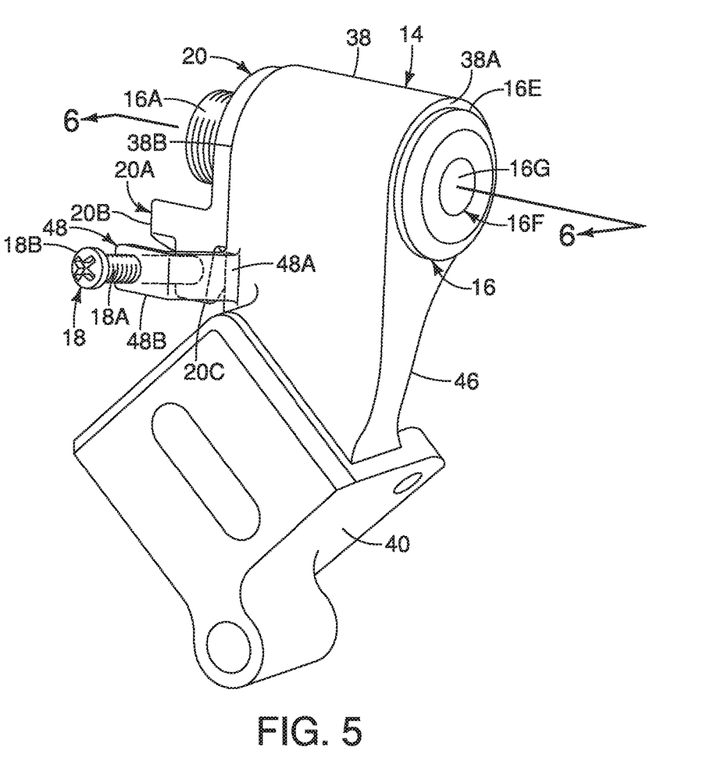
FIG. 5 is an enlarged perspective view of the base member of the bicycle rear derailleur.

The base member 14 is preferably constructed of a hard rigid material, such as a lightweight metal. The base member 14 has a frame mounting portion 38 and a link supporting portion 40. The frame mounting portion 38 is substantially cylindrical, as shown in FIG. 5. An arm part 46 extends radially from the frame mounting portion 38 to connect the link supporting portion 40 to the frame mounting portion 38. The link supporting portion 40 is disposed at an end of the arm part 46 opposite the frame mounting portion 38.

Figure 6:
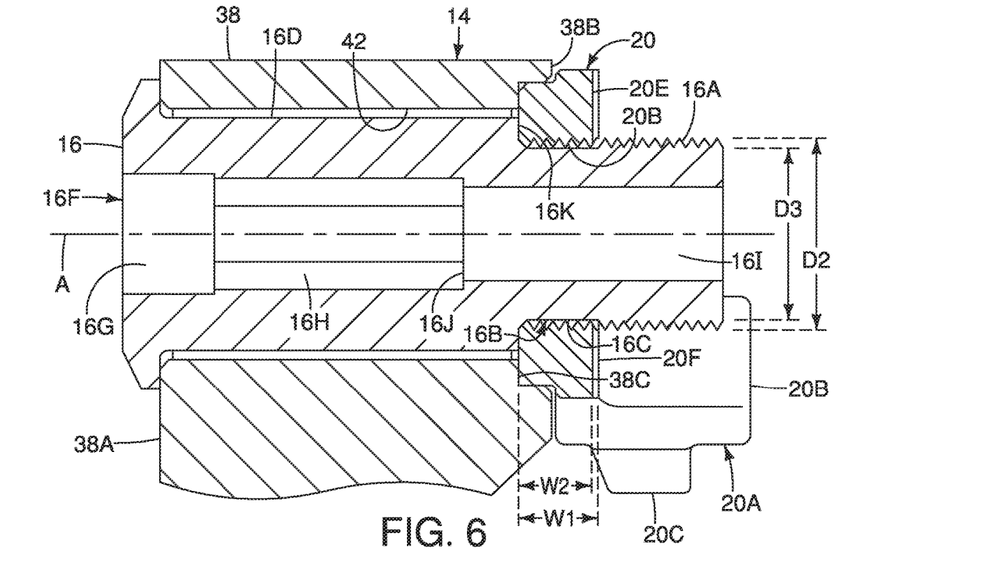
FIG. 6 is a front elevational view in cross section of the base member taken along line 6-6 of the bicycle rear derailleur of FIG. 5 in a state where the bicycle rear derailleur is mounted to the bicycle (the bicycle being removed for clarity)
Figure 7:
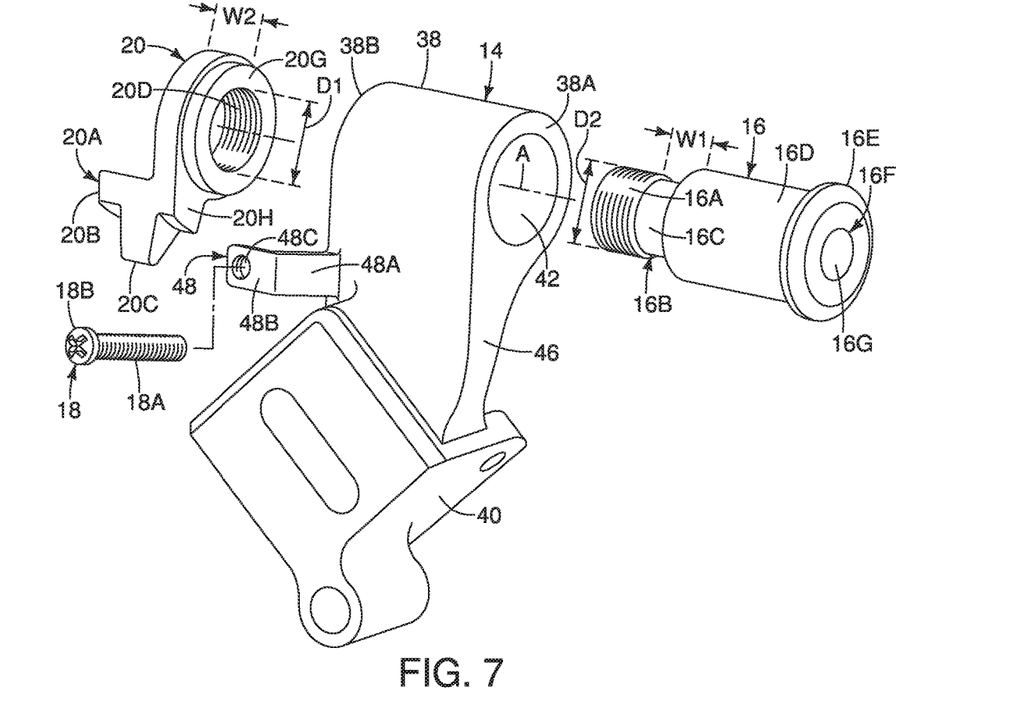
FIG. 7 is an exploded assembly view of the bicycle rear derailleur of FIG. 1.

The frame mounting portion 38 has a mounting opening 42 that rotatably receives the fastening member 16, as shown in FIGS. 6 and 7. The mounting opening 42 has an unthreaded, inner peripheral surface. The mounting opening 42 extends axially from a first outer surface 38A of the frame mounting portion 38 to a second outer surface 38B of the frame mounting portion 38. The mounting opening 42 is beveled at the first outer surface 38A to facilitate insertion of the fastening member 16. The second outer surface 38B has a stepped portion 38C to facilitate receiving the intermediate member 20.

An adjusting tab 48 extends outwardly from the arm part 46 of the base member 14, as shown in FIGS. 5 and 7. The adjusting tab 48 is substantially L-shaped with a first leg 48A extending outwardly from the arm part 46 and a second leg 48B extending at an angle from an end of the first leg 48A. An adjusting member opening 48C is disposed in the second leg 48B of the adjusting tab 48 to receive the adjusting member 18. The adjusting member opening 48C is preferably threaded to facilitate movably receiving the adjusting member 18. Preferably, the base member 14 is unitarily formed as a one-piece member, such that the frame mounting portion 38, the link supporting portion 40, the arm part 46 and the adjusting tab 48 are formed as a one-piece member.

The fastening member 16 extends through the mounting opening 42 of the base member 14, as shown in FIG. 6. The fastening member 16 has a first threaded portion 16A and a placement portion 16B. As shown in FIG. 7, the first threaded portion 16A is a male thread. The placement portion 16B is adjacent to the first threaded portion 16A. The placement portion 16B and the first threaded portion 16A project from the frame mounting portion 38 when the fastening member 16 is received by the mounting opening 42, as shown in FIG. 6. As shown in FIG. 7, the placement portion 16B includes a non-threaded portion. Preferably, the non-threaded portion includes a first non-threaded portion 16C and a second non-threaded portion 16D. As shown in FIGS. 6 and 7, a diameter (second diameter) of the second non-threaded portion 16D is larger than a, diameter (first diameter) of the first non-threaded portion 16C, thereby forming a shoulder 16K. A radially extending annular flange 16E is disposed at an end of the second non-threaded portion 16D. The placement portion 16B is concentrically arranged within the frame mounting portion 38 of the base member 14, while the annular flange 16E abuts the first outer surface 38A of the frame mounting portion 38.

The fastening member 16 includes a tool engagement portion 16F. The tool engagement portion 16F is configured to receive a tool to rotate the fastening member 16 relative to the base member 14 and the intermediate member 20 about a rotational center axis A. The placement portion 16B is disposed between the tool engagement portion 16F and the first threaded portion 16A, as shown in FIG. 7. In particular, the tool engagement portion 16F includes a first circular bore 16G that extends axially inward from the annular flange 16E and a non-circular bore 16H extending axially inward from the first circular bore 16G. The non-circular bore 16H of the tool engagement portion 16F is preferably hexagonally shaped as viewed along the rotational center axis A of the fastening member 16. A second circular bore 16I extends axially from an end of the non-circular bore 16H such that the non-circular bore 16H is disposed between the first and second circular bores 16G and 16H in the axial direction of the fastening member 16. A shoulder 16J is formed at the end of the non-circular bore 16H to limit an insertion depth of a tool. As shown in FIG. 6, the first circular bore 16G has a larger diameter than the second circular bore 16H. The fastening member 16 secures the bicycle rear derailleur 12 to a rear mounting portion of the bicycle frame 10 of the bicycle as shown in FIG. 1. The first and second circular bores 16G and 16I and the non-circular bore 16H preferably define a passage that extends completely through the fastening member 16.

Figure 4:
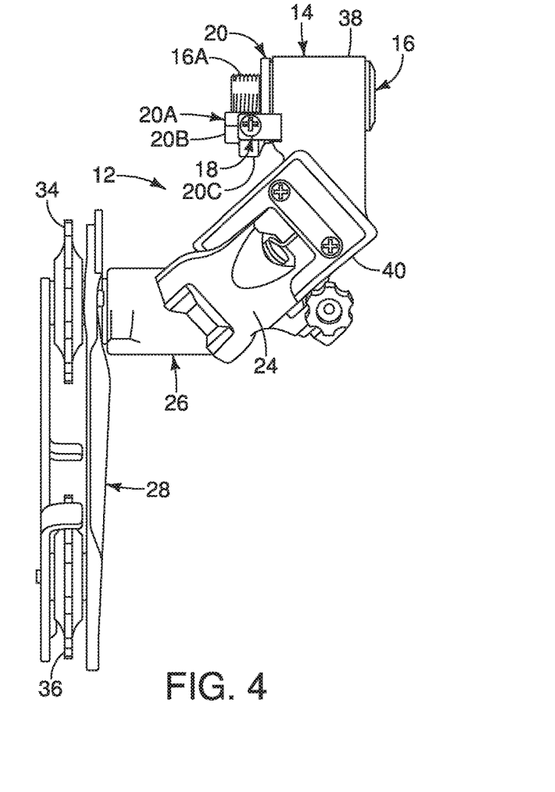
FIG. 4 is a partial rear elevational view of the bicycle rear derailleur.

The adjusting member 18 is received by the adjusting member opening 48C (FIG. 7) in the adjusting tab 48, as shown in FIGS. 1, 4 and 5. The adjusting member 18 can be any suitable member movably receivable by the adjusting member opening 48C, such as a threaded fastener. The adjusting member 18 includes a threaded shaft portion 18A that threadedly engages the adjusting member opening 48C and a tool engagement portion 18B. The tool engagement portion 18B is engaged by a tool, such as a screwdriver, to rotate the adjusting member 18 through the adjusting member opening 48C of the adjusting tab 48.

The intermediate member 20 is preferably constructed of a hard rigid material, such as a metal. The intermediate member 20 is operatively disposed on the fastening member 16 between the base member 14 and the bicycle frame 10 of the bicycle. The intermediate member 20 includes a contact portion 20A that is disposed between the adjusting member 18 and the bicycle in the state where the bicycler rear derailleur 12 is mounted to the bicycle. The contact portion 20A includes a first contact portion 20B that contacts the bicycle frame 10 in the state where the bicycle rear derailleur 12 is mounted to the bicycle. The contact portion 20A includes a second contact portion 20C that is engaged by the adjusting member 18.

Figure 2:
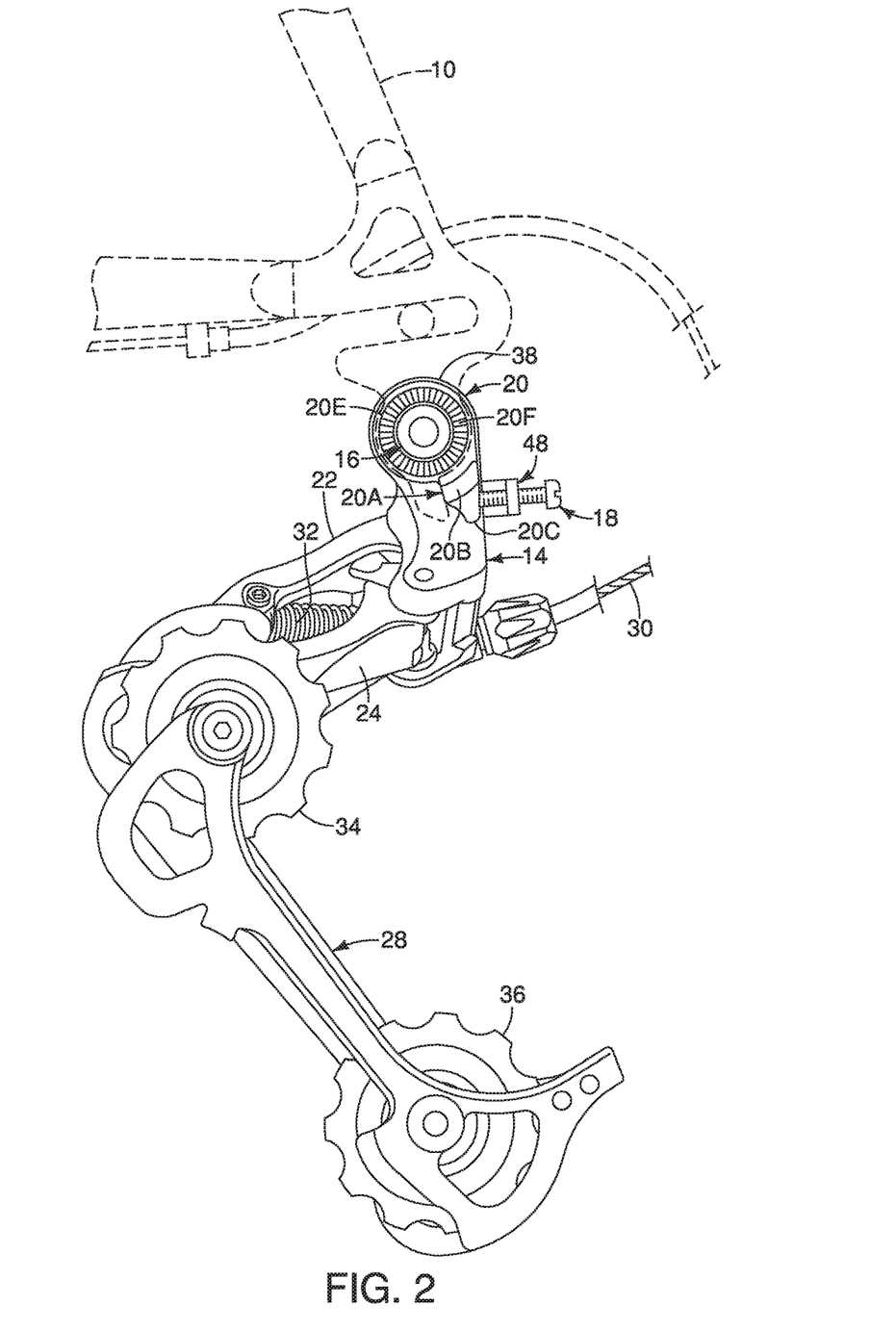
FIG. 2 is an enlarged inboard side elevational view of the bicycle rear derailleur of FIG. 1 removed from the bicycle for clarity.
Figure 3:
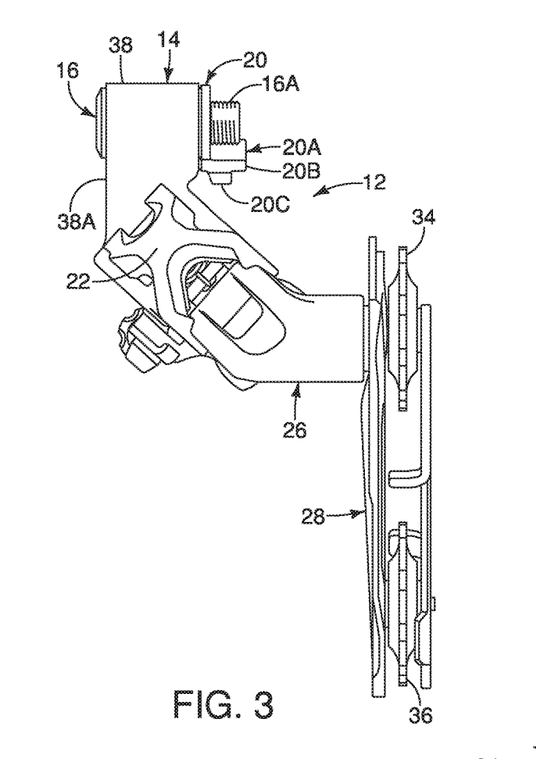
FIG. 3 is a partial front elevational view of the bicycle rear derailleur in accordance with the illustrated embodiment.

The intermediate member 20 includes a second threaded portion 20D configured to threadedly engage with the first threaded portion 16A of the fastening member 16. As shown in FIG. 7, the second threaded portion 20D is a female thread. A first (outer) surface 20E includes a knurled portion 20F, as shown in FIG. 2. A shoulder 20G extends outwardly from a second (outer) surface 20H of the intermediate member 20, as shown in FIG. 7. The intermediate member 20 is preferably unitarily formed as a one-piece member.

To secure the base member 14 to the bicycle frame 10, intermediate member 20 is disposed such that the shoulder 20G is received by the stepped portion 38C of the base member 14 and the shoulder 16K of the fastening member 16, as shown in FIGS. 5 and 6. The stepped portion 38C and the shoulder 16K facilitate properly positioning the intermediate member 20. The fastening member 16 is then inserted through the mounting opening 42 of the base member 14. A tool can be used to thread the fastening member 16 through the intermediate member 20 when the first threaded portion 16A of the fastening member 16 engages the second threaded portion 20D of the intermediate member 20. The fastening member 16 is threaded through the intermediate member 20 until the first threaded portion 16A is disposed externally of the intermediate member 20. Preferably the entirety of the first threaded portion 16A is disposed externally of the intermediate member 20 such that the first threaded portion 16A is not engaging the second threaded portion 20D. The base member 14 is slidably disposed with respect to the fastening member 16. With this configuration, the intermediate member 20 is prevented from being accidentally removed from the fastening member 16. To remove the intermediate member 20, the first threaded portion 16A of the fastening member 16 has to be threadedly engaged with the second threaded portion 20D of the intermediate member 20 and then continued rotating to threadedly disengage the intermediate member 20 from the fastening member 16.

The first threaded portion 16A of the fastening member 16 can then be engaged with a corresponding opening in the bicycle frame 10 of the bicycle. The first threaded portion 16A (FIG. 5) threadedly engages the bicycle frame 10 to secure the bicycle rear derailleur 12 to the bicycle, as shown in FIG. 1. When the bicycle rear derailleur 12 is mounted to the bicycle frame 10, the intermediate member 20 is substantially immovably disposed between the bicycle frame 10 and the base member 14. The intermediate member 20 includes the first surface 20E that faces a vertical center plane of the bicycle in the state where the bicycle rear derailleur 12 is mounted to the bicycle. To further prevent rotational movement of the intermediate member 20 with respect to the bicycle frame 10, the knurled portion 20F of the first surface 20E of the intermediate member 20 engages the bicycle frame 10. The knurled portion 20F increases the friction between the intermediate member 20 and the bicycle frame 10 in the mounted state, thereby facilitating maintaining the rotational orientation of the intermediate member 20 with respect to the bicycle frame 10. To further substantially prevent rotational movement of the intermediate member 20, the bicycle frame 10 can be provided with a corresponding knurled portion.

The intermediate member 20 is disposed on the placement portion 16B of the fastening member 16 in the state where the bicycle rear derailleur 12 is mounted to the bicycle, as shown in FIGS. 1 and 6. More specifically, the intermediate member 20 is disposed on the first non-threaded portion 16C of the fastening member 16. As shown in FIGS. 6 and 7, the second threaded portion 20D has an innermost diameter D1 that is smaller than an outermost diameter D2 of the first threaded portion 16A. The placement portion 16B has a diameter D3 that is smaller than an outermost diameter D2 of the first threaded portion 16A. As shown in FIGS. 6 and 7, a first axial width W1 of the placement portion 16B is larger than a second axial width W2 of the second threaded portion 20D of the intermediate member 20 with respect to an axial direction parallel to the rotational center axis A of the fastening member 16, such that the intermediate member 20 is more surely disposed on the placement portion 16B of the fastening member 16. Accordingly, the configuration illustrated in this exemplary embodiment substantially prevents accidental removal of the intermediate member 20 from the fastening member 16.

The adjustment member 18 is configured to adjust a position of the bicycle rear derailleur 12 relative to the bicycle in a state where the bicycle rear derailleur 12 is mounted to the bicycle, as shown in FIG. 1. A tool is engageable with the tool engagement portion 18B of the adjusting member 18 to threadedly move the adjusting member 18 relative to the adjusting tab 48. The adjusting member 18 is set to the desired position of the bicycle rear derailleur 12. The adjusting member 18 contacts the second contact portion 20C of the contact portion 20A of the intermediate member 20 to set the desired position of the bicycle rear derailleur 12. The first contact portion 20B of the contact portion 20A of the intermediate member 20 contacts the bicycle frame 10 in the state where the bicycle rear derailleur 12 is mounted to the bicycle. Movement of the adjusting member 18 with respect to the adjusting tab 48 changes the relative position of the bicycle rear derailleur 12 with respect to the bicycle frame 10. By changing the relative position of the bicycle rear derailleur 12, the relative position of the guide pulley 34 with respect to a sprocket assembly of the bicycle changes.

Figure 8:
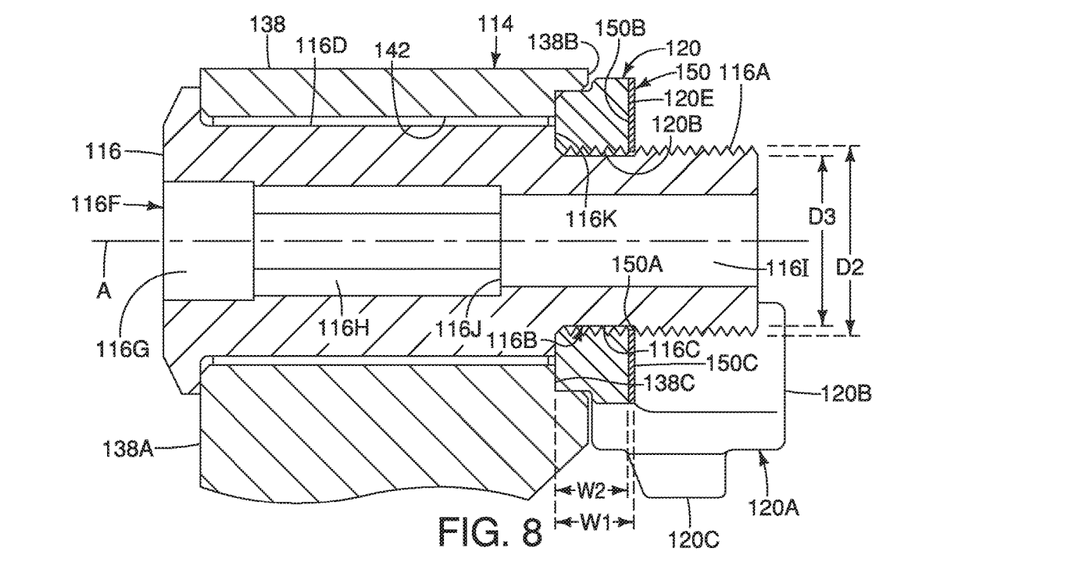
FIG. 8 is a front elevational view in cross section of the bicycle rear derailleur in accordance with another illustrated embodiment.

As shown in FIG. 8, a bicycle rear derailleur in accordance with another illustrated exemplary embodiment of the present invention is substantially similar to the bicycle rear derailleur 12 of the exemplary embodiment illustrated in FIGS. 1 to 7 except for the differences described below. Similar parts are identified with similar reference numerals, except increased by 100 (i.e., 1xx, accordingly).

As shown in FIG. 8, a gasket 150 is disposed on the placement portion 116B of the fastening member 116. The intermediate member 120 includes a first surface 120E facing a vertical center plane of the bicycle in the state where the bicycle rear derailleur is mounted to the bicycle. The gasket 150 is disposed adjacent to the first (outer) surface 120E of the intermediate member 120. The gasket 150 is preferably an O-ring made of a non-metallic material, such as a plastic material.

The gasket 150 has an opening 150A configured to receive the fastening member 116. A first axially facing surface 150B of the gasket 150 faces the first surface 120E of the intermediate member 120. A second axially facing surface 150O of the gasket 150 faces the bicycle frame 10 in the state where the bicycle rear derailleur is mounted to the bicycle.

To further prevent rotational movement of the intermediate member 120 with respect to the bicycle frame 10 (FIGS. 1 and 2), the gasket 150 is disposed between the first surface 120E of the intermediate member 120 and the bicycle frame 10 in the state where the bicycle rear derailleur is mounted to the bicycle. The gasket 150 increases friction with the bicycle frame 10, thereby maintaining a rotational orientation of the intermediate member 120 with respect to the bicycle.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side". "forward". "rearward", "front", "rear", "up", "down", "above", "below", "upward", "downward", "top". "bottom", "side", "vertical", "horizontal", "perpendicular" and "transverse" as well as any other similar directional terms refer to those directions of a bicycle in an upright, riding position and equipped with the bicycle rear derailleur. Accordingly, these directional terms, as utilized to describe the bicycle rear derailleur should be interpreted relative to a bicycle in an upright riding position on a horizontal surface and that is equipped with the bicycle rear derailleur. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rear derailleur comprising:
   a base member including a frame mounting portion having a mounting opening;
   a fastening member extending through the mounting opening of the base member, the fastening member having a first threaded portion and a placement portion adjacent to the first threaded portion;
   an adjusting member configured to adjust a position of the bicycle rear derailleur relative to a bicycle in a state where the bicycle rear derailleur is mounted to the bicycle; and
   an intermediate member including a contact portion disposed between the adjusting member and the bicycle in the state where the bicycle rear derailleur is mounted to the bicycle, the intermediate member having a second threaded portion configured to threadedly engage with the first threaded portion of the fastening member, the second threaded portion having an innermost diameter that is smaller than the outermost diameter of the first threaded portion, the intermediate member being disposed on the placement portion of the fastening member in the state where the bicycle rear derailleur is mounted to the bicycle.

2. The bicycle rear derailleur according to claim 1, wherein
   the placement portion includes a non-threaded portion.

3. The bicycle rear derailleur according to claim 2, wherein
   the non-threaded portion includes a first non-threaded portion and a second non-threaded portion, and
   the intermediate member is disposed on the first non-threaded portion.

4. The bicycle rear derailleur according to claim 3, wherein
   the first non-threaded portion has a first diameter, and
   the second non-threaded portion has a second diameter that is larger than the first diameter of the first non-threaded portion.

5. The bicycle rear derailleur according to claim 1, wherein
   the fastening member includes a tool engagement portion.

6. The bicycle rear derailleur according to claim 5, wherein
   the placement portion is disposed between the tool engagement portion and the first threaded portion.

7. The bicycle rear derailleur according to claim 1, wherein
   the placement portion has a diameter that is smaller than the outermost diameter of the first threaded portion.

8. The bicycle rear derailleur according to claim 1, wherein
   a first axial width of the placement portion is larger than a second axial width of the second threaded portion of the intermediate member with respect to an axial direction parallel to a rotational center axis of the fastening member.

9. The bicycle rear derailleur according to claim 1, wherein
   the base member is slidably disposed with respect to the fastening member.

10. The bicycle rear derailleur according to claim 1, wherein
    the first threaded portion includes a male thread, and
    the second threaded portion includes a female thread.

11. The bicycle rear derailleur according to claim 1, wherein
    the intermediate member includes a first surface facing a vertical center plane of the bicycle in the state where the bicycle rear derailleur is mounted to the bicycle, the first surface includes a knurled portion.

12. The bicycle rear derailleur according to claim 1, further comprising
    a gasket disposed on the placement portion of the fastening member,
    the intermediate member including a first surface facing a vertical center plane of the bicycle in the state where the bicycle rear derailleur is mounted to the bicycle, the gasket being disposed adjacent to the first surface of the intermediate member.

* * * * *